April 29, 1969   P. R. BELL ET AL   3,441,351
COLOR RECORDING AVERAGING LIGHT INTENSITY METER
Filed May 3, 1965
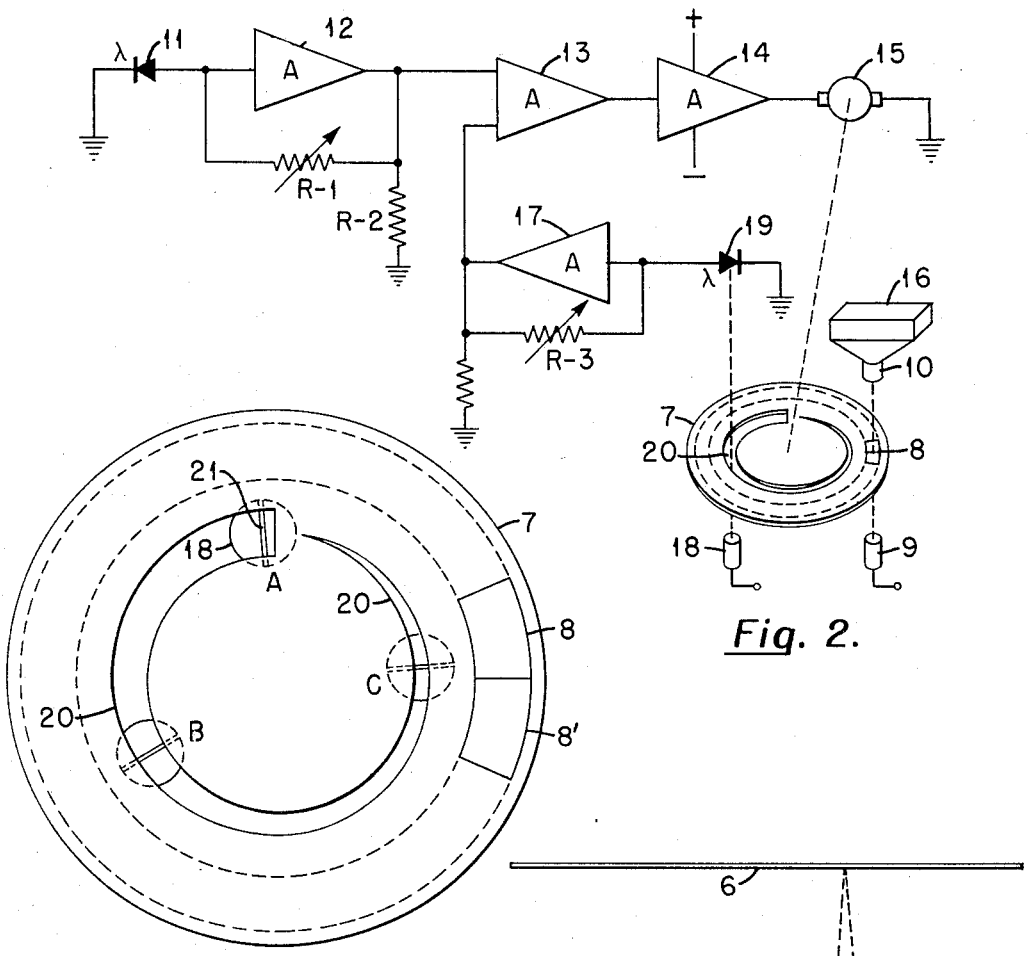
Fig. 2.
Fig. 3.
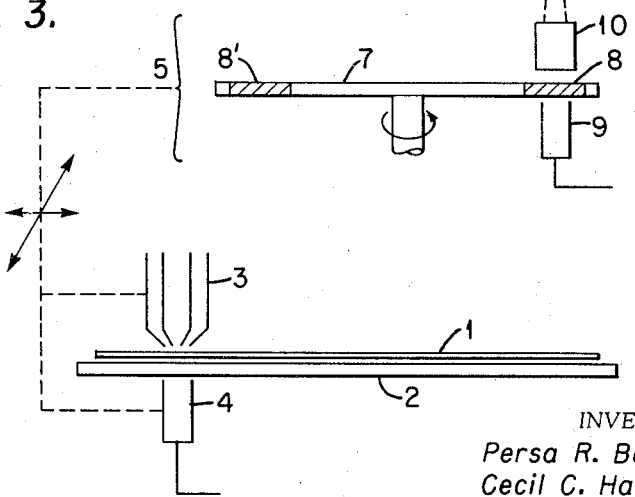
Fig. 1.
INVENTORS.
Persa R. Bell
Cecil C. Harris
ATTORNEY.

2

United States Patent Office 3,441,351
Patented Apr. 29, 1969

3,441,351
COLOR RECORDING AVERAGING LIGHT
INTENSITY METER
Persa R. Bell and Cecil C. Harris, Oak Ridge, Tenn., assignors to the United States of America as represented by the United States Atomic Energy Commission
Filed May 3, 1965, Ser. No. 452,951
Int. Cl. G01j 3/46; G01n 21/06, 21/22
U.S. Cl. 356—175                    3 Claims

ABSTRACT OF THE DISCLOSURE

A system is provided for quantitatively analyzing data contained in chromatagrams, electrophoresis records, and many photographic images particularly those depicting the distribution of radioactive substances in a structure such as body organs, and more particularly to a means for producing color rescans from such images of original scan records of medical patients, such that color is injected into the rescan record rather than into the original scan as is done in prior systems, and a color rescan record is thus provided that is not preprejudiced and in which the time lag between sensing and recording is greatly reduced.

---

A typical system for the scan of body tissue for radioactive retention using a focusing collimator detector and spectrometry is set forth in U.S. Patent No. 2,942,109, issued June 21, 1960, to P. R. Bell et al. This system can then be used to provide an original black-white chart record of radioactive deposits in body organs. Normally the chart or scan record of the scanning system is analyzed by eye. Areas of the scan vary as to the number of indications which are, in turn, proportional to the radiation detected. The information is, however, statistically variable and a careful integration must be done. Areas of significant contrast can generally be noted, but the exact contour or extent of distribution of radioactive material is difficult for the human eye to perceive. This is due to the fact that the area over which the eye integrates information tends to remain fixed and is a function of the recording method.

In order to provide a better analysis of the original scan record, this record may be rescanned by a suitable detector and amplifier circuit to provide a black-white rescan record on a chart, and this reanalysis may be performed as often as desired, and the conditions varied as desired, without subjecting the patient to any additional radiation or discomfort. The rescanning often reveals information not at first evident in original scan records, and is used effectively in determining the statistical significance of small variations in a scan record. Such a rescanning system is set forth in AEC Report TID-7673, 1963, pp. 81–104, and an improvement over that rescanning system is described in a paper presented at the International Atomic Energy Agency Symposium on Medical Radioisotope Scanning, at Athens, Greece, April 20–24, 1964, entitled "Analysis of Scan Records With a Recording Densitometer—The Re-Scanner," by C. C. Harris et al.

The above systems provide a black-white rescan record, and the rescanner as described in each of the above systems is, in effect, a recording averaging light intensity meter. Light is passed through or reflected from the scan record and an apertured sensor is moved over the record to measure the light transmission or reflection as a function of position. The resultant signal is then normally converted into another image for visual analysis. For some applications the above rescanning systems for providing black-white rescan records for visual analysis are sufficiently accurate to provide adequate results. However, in other applications the black-white original records or rescan records do not provide for adequate visual analysis of such records since the eye is unsensitive in distinguishing count rates that differ by less than 20 percent.

In order to provide better contrast enhancement thus making the high count rates more prominent and for distinguishing count rates that differ by less than 20 percent, color recording in providing direct, original scan records has been used in some prior systems. Such a color scan is made semiquantitative by assigning a specific color to each of several bands of count rates. Where the count rates differ by less than 20 percent, the color coding reinforces, or corrects, a judgment that might be uncertain otherwise. One system for direct color recording of scan information is described in a Medical News item published in "Journal of the American Medical Association," vol. 188, No. 11, pp. 25–28, June 15, 1964, by Henry L. Jaffe et al., and some of the advantages of color scanning are set forth in that article. Another system for direct color recording of scan information is described in AEC Report TID-7673, 1963, pp. 111–131. However, the above systems for providing direct color scan records have several disadvantages. For example, these color systems all preprejudice the interpretation by short-term averaging of the counting rate. This is caused by monodimensional integration inherent in count-rate meters or scaling techniques as used in these systems. Also, in these systems the movement of the color selector is delayed compared to the real count rate because of the inherent time lag in the count-rate meter such that an accurate record is difficult to achieve.

With a knowledge of the limitations of prior systems for providing direct, original color recordings of scan information as discussed above, it is a primary object of the present invention to provide a color recording averaging light intensity meter system in which a color scan record is provided that is not preprejudiced and in which the time lag between sensing and recording is greatly reduced.

It is another object of the present invention to provide a color recording system as in the preceding object wherein the color selected for recording is accomplished in a unique manner.

These and other objects and advantages of the present invention will become apparent upon a consideration of the following detailed specification and the accompanying drawings, wherein:

FIG. 1 is a schematic diagram of apparatus designed to accomplish the above objects;

FIG. 2 is a schematic wiring diagram of a control system used with the system of FIG. 1; and FIG. 3 shows the position detector and color wheel as used in the circuit of FIG. 2.

The above objects have been accomplished in the present invention by providing a color "rescanning" system as opposed to the direct color scanning systems of the above-mentioned prior systems, wherein color will be "injected" into the rescan record rather than into the original scan as in the prior systems.

The basic arrangement for the color rescan system of the present invention is shown in FIG. 1. The original black-white scan record 1 is supported on a transparent plate 2 while a sensor unit 3 is moved over the surface of the scan record in a definite pattern. A light source 4 is simultaneously moved beneath the plate 2 so as to illuminate the portion of the record being "read" by the sensor. Alternatively, the light source may be placed above the record 1 and directed toward the surface thereof such that the light reflected from the record is sensed by the sensor 3. The sensor 3 may be a two-field light sensor such as described in the above-mentioned paper presented at Athens, Greece, for example, or any other suitable single-field sensor. The present invention will be described using only the central detecting region of the sensor 3, it being understood that both detecting regions of the sensor 3 can be used, if desired, in the same manner as set forth in the above paper to provide a combined output signal to the control circuit of FIG. 2 to be described below.

In mechanical synchronism with the sensor 3 in any desired size proportionality is a unit 5 for directing a beam of appropriately colored light upon a photographic color film 6 at a location corresponding to the position of the sensor 3 with respect to the scan record 1. In other words, the unit 5, including the rotatable wheel 7 with its plurality of color filters 8, 8', etc., the light source 9 and the lens system 10, is mechanically coupled to the units 3, 4 such that they are moved to corresponding positions to provide a rescan record on film which contains a highly related image of the original scan record, said image differing in color from the original scan record while at the same time providing a much improved contrast enhancement. The color filter selected for insertion between the light source 9 and lens system 10 is dependent upon the light transmission of or reflection of the scan record 1 as seen by the sensor 3. The means for orientation of the wheel 7 to provide the proper color filter will be described below in connection with FIG. 2.

In FIG. 2, a photosensitive detector 11 which may be a photodiode, for example, associated with the central viewing field area of the sensor 3 of FIG. 1, is connected to an amplifier 12 having a feedback loop closed by resistor R–1. This resistor permits the selection of the range of film density above which the averaging light intensity meter is to analyze. The output voltage, as developed across the resistor R–2, is fed into a comparator unit 13 and the output therefrom is fed into an amplifier 14 to drive a motor 15. The motor 15 is the drive unit for the color wheel 7 and thus positions an appropriate color filter 8, only one of which is shown, between the light source 9 and the lens system 10 of the camera 16 containing color film. The camera 16 may be a self-developing color camera, for example. The light source 9 may be operated continuously or it may be pulsed. When the light source is pulsed, the pulse rate is chosen to be synchronous with the film motion so that the color spots on the film are contiguous, but do not overlap.

Although other means may be used, the color wheel 7 is correctly positioned by a feedback signal from the amplifier 17 to the comparator 13 as derived from a light source 18 and a photosensitive detector 19 which may be a photodiode, for example. A resistor R–3 provides for obtaining the proper output from detector 19 for the feedback to comparator 13.

A clear understanding of the position detector function of wheel 7 is illustrated in FIG. 3. Preferably inward from the color filters 8, 8' (only two being shown) in the wheel 7 is positioned a transparent, azimuthally tapering region 20. The light source 18 mounted beneath the wheel 7 is provided with a shield having a slit 21 aligned transverse to the length of the region 20. A corresponding slit (not shown) is used in the detector 19 (not shown). Depending upon the position of the wheel relative to the slit 21, as illustrated at positions A, B, C, for example, the amount of light transmitted from the source 18 to the detector 19 will be a function of the position of wheel 7. Thus, the wheel can be driven by the motor 15 of FIG. 2 to a position such that the input signal to the comparator 13 from the detector 11 is matched by the output of the detector 19. Accordingly, as long as there is a difference between the output of the detector 11 and the output of the detector 19 the comparator 13 will provide an output signal and the motor 15 will be energized until this difference is equalized at which time the output of the comparator 13 is zero and the motor 15 stops. At this time, the desired color filter 8 is then aligned between the light source 9 and the film of camera 16. For each new subsequent sensing position of the detector 11 and the light source 4 with respect to the scanning of the record 1, any subsequent difference between the output of the detector 11 and the output of the detector 19 will be equalized in the same manner set forth above for each new scanning position and the desired color filter will be inserted between the light source 9 and the film of camera 16 for each of such new scanning positions. The system of the present invention provides a color rescan record in which the accentuation and visualization of small variations in counting rate are achieved and can easily be observed, while such small variations in counting rate could only be suspected from an observation of the original black-white scan record.

It should be noted that the motor 15, wheel 7, and light sources 9 and 18 are enclosed in any suitable light box, not shown, and light is directed to the camera 16 and the detector 19 through slits in the dark box. Also, any suitable light shielding is provided within the light box between the respective light paths therein.

The range of opaqueness on the original scan record can be divided into any desired units, e.g., ten, with ten different colors then used on the wheel 7. Any combination of divisions and colors may be utilized to enhance the study of scans for particular information, and the divisions need not be uniform, thus effecting the introduction of any desired thresholds in analyzing the information.

It should be noted that, alternatively, the light source 18 of FIG. 2 may be placed above the wheel 7 and the region 20 of the wheel provided with a highly reflective surface such that the light reflected therefrom is directed to the detector 19, and the amount of light reflected being a function of the wheel position.

It should also be noted that the present invention is not limited to the use of a wheel for color selection. For example, an elongated rectangular strip may be used in place of the wheel and the various color filters placed in line with each other in one longitudinal half of the strip, while an elongated tapered transparent or reflective region is positioned in the other half of the strip for providing the sensing position signals to the control circuit of FIG. 2. The motor 15 would then be used to position the strip along its longitudinal direction by means of conventional worm-screw gearing coupled thereto.

The color rescanning system described above produces a rapid rescan color record and this record is provided with adequate contrast enhancement such that semi-quantitative visual analysis can be made of such a record. The concept of introducing color into the rescan record, as described above, instead of into an original scan record as in the prior systems, does not preprejudice the color rescan record. Thus, the inherent disadvantages of systems for providing direct color scan records as discussed above, such as short-term averaging of the counting rate and the inherent time lag of the counting rate meter, are substantially reduced in the color rescanning system of the present invention, since the information used for color rescanning in the present system is obtained from an original black-white scan record, while the information used for the prior, direct color scanning systems is obtained directly from an object under study, such as a medical patient.

It should be understood that the above-described system can equally be used for providing color rescans of other type records for reanalysis thereof. Examples of other type records are set forth in the beginning of this specification.

This invention has been described by way of illustration rather than by way of limitation and it should be apparent that the invention is equally applicable in fields other than those described.

What is claimed is:

1. A system for rescanning and measuring the variation of light transmission through an object of varying opacity and providing a rescan record thereof in color, comprising a first light source, a photosensitive detector positioned for receiving light from said source through said object placed therebetween, means for moving said light source and said detector simultaneously with respect to said object to rescan said object and provide a variable output signal from said detector as a function of the amount of light received through said object at each scanning position, a second light source, a camera provided with color film in alignment with said second light source, a movable member provided with a plurality of color filters and being interposed between said camera and said second light source and being adapted to position one of said filters between said second light source and said camera for each of said scanning positions, motor means coupled to said movable member for effecting movement thereof to position said one of said filters between said second light source and said camera, means for sensing the position of said movable member which includes a third light source and a second photosensitive detector, said movable member also being provided with a tapered transparent opening, said third light source being directed through said opening to said second detector, said second detector thereby providing an output signal as a function of the amount of light received from said third light source as determined by the position of said movable member, means mechanically coupled to said means for moving said first light source and first detector for providing corresponding movement of said movable member, said second and third light sources, said second detector and said motor means with respect to said camera for each of said scanning positions, means for respectively amplifying the outputs of said first and second detectors, means for comparing the amplified output from said first detector with the amplified output from said second detector for each of said scanning positions, said comparing means providing an output signal at each scanning position as long as there is any difference between said respective output signals from said detectors, means for connecting the output of said comparing means to said motor means for driving said movable member until said difference between said detector output signals is equalized for each of said scanning positions, thus sequentially positioning one of said color filters of said member between said second light source and the film of said camera for each of a plurality of said scan positions during the rescanning of said object.

2. The system set forth in claim 1, wherein said movable member is a wheel.

3. The system set forth in claim 2, wherein said object is an original black-white scan record of radioactive deposits in a body organ of a medical patient.

References Cited

UNITED STATES PATENTS

| | | | |
|---|---|---|---|
| 2,582,073 | 1/1952 | Scudder. | |
| 2,615,778 | 10/1952 | Butz | 95—31 X |
| 3,004,101 | 10/1961 | Jacobs et al. | 250—93 X |
| 3,214,515 | 10/1965 | Eberline | 178—6.8 |
| 3,229,089 | 1/1966 | Sasao | 250—65 |
| 3,270,348 | 8/1966 | Lesage et al. | 346—33 |

OTHER REFERENCES

"Scan Recording in Color," Kakehi et al., AEC Report TID-7673, 1963, pp. 111–115, 117, 130–131.

RONALD L. WIBERT, *Primary Examiner.*

R. J. WEBSTER, *Assistant Examiner.*

U.S. Cl. X.R.

356—203; 96—2; 350—315; 250—218; 95—73; 178—5.2